(12) United States Patent
Suzuki et al.

(10) Patent No.: US 9,096,004 B2
(45) Date of Patent: Aug. 4, 2015

(54) METHOD OF PRODUCING A RESIN MOLDED ARTICLE

(71) Applicant: Inoac Corporation, Nagoya, Aichi (JP)

(72) Inventors: Hiroshi Suzuki, Anjo (JP); Yoshihiro Kushiya, Anjo (JP); Yuzo Ito, Anjo (JP); Shigeki Suzuki, Anjo (JP)

(73) Assignee: INOAC CORPORATION, Aichi (JP)

( * ) Notice: Subject to any disclaimer, the term of this patent is extended or adjusted under 35 U.S.C. 154(b) by 267 days.

(21) Appl. No.: 13/655,232

(22) Filed: Oct. 18, 2012

(65) Prior Publication Data

US 2013/0095287 A1 Apr. 18, 2013

(30) Foreign Application Priority Data

Oct. 18, 2011 (JP) .................. 2011-229231
Jun. 21, 2012 (JP) .................. 2012-140148

(51) Int. Cl.
*B29C 45/16* (2006.01)
*B29L 31/30* (2006.01)

(52) U.S. Cl.
CPC ......... *B29C 45/1657* (2013.01); *B29C 45/1675* (2013.01); *B29L 2031/3008* (2013.01); *B29L 2031/3041* (2013.01); *Y10T 428/24314* (2015.01); *Y10T 428/24612* (2015.01)

(58) Field of Classification Search
None
See application file for complete search history.

(56) References Cited

U.S. PATENT DOCUMENTS

| | | | |
|---|---|---|---|
| 893,375 A | 7/1908 | Rische | |
| 2,093,523 A | 9/1937 | Kiyohara | |
| 2,510,091 A * | 6/1950 | Dofsen et al. | 264/161 |
| 3,028,283 A * | 4/1962 | Lundgren et al. | 264/245 |
| 3,031,722 A * | 5/1962 | Gits | 264/246 |
| 3,847,699 A | 11/1974 | Shaw et al. | |
| 4,042,090 A * | 8/1977 | Hasebe et al. | 400/490 |
| 4,203,941 A * | 5/1980 | Brooker | 264/250 |
| 4,676,941 A * | 6/1987 | Shiho et al. | 264/247 |
| 5,073,325 A | 12/1991 | Gray | |
| 5,275,407 A * | 1/1994 | Soong | 473/549 |
| 5,427,372 A * | 6/1995 | Ratner et al. | 156/147 |
| 5,756,013 A * | 5/1998 | Yanagihara et al. | 264/1.7 |
| 6,579,485 B2 * | 6/2003 | Smith et al. | 264/247 |
| 6,726,868 B1 * | 4/2004 | Panfili et al. | 264/247 |
| 7,070,724 B2 * | 7/2006 | Nakazawa | 264/250 |
| 7,588,814 B2 | 9/2009 | Olley et al. | |
| 7,922,956 B1 * | 4/2011 | Scheidmantel et al. | 264/294 |
| 8,641,955 B2 * | 2/2014 | Gauthier et al. | 264/255 |
| 2004/0017023 A1 * | 1/2004 | Schoemann et al. | 264/245 |

FOREIGN PATENT DOCUMENTS

| | | |
|---|---|---|
| GB | 1 418 811 A | 12/1975 |
| JP | 59-142113 | * 8/1984 |

(Continued)

*Primary Examiner* — Edmund Lee
(74) *Attorney, Agent, or Firm* — DLA Piper LLP (US)

(57) ABSTRACT

A resin molded article for, for instance, vehicles formed thereon a stitch pattern, including a first member (32) having a plurality of thread stitch portions (34, 36) protruding towards a design surface (31) and formed on a front side in alignment and a second member (44) formed such that the front side of the first member (32) is covered thereby and the protruding ends of the thread stitch portions (34, 36) are exposed from the second member (44). The surface of the second member (44) constituting the design surface (31) and the protruding ends of the thread stitch portions (34, 36) exposed from the second member (44) are in colors different from each other, and stitches in a stitch pattern are configured on the design surface (31) of the resin molded article by the plurality of thread stitch portions (34, 36).

4 Claims, 14 Drawing Sheets

(56) References Cited

FOREIGN PATENT DOCUMENTS

| JP | S64-64818 A | 3/1989 |
| JP | H1-244937 A | 9/1989 |
| JP | 2-111513 A | 4/1990 |
| JP | 2005-125845 A | 5/2005 |
| JP | P2007-269221 A | 10/2007 |
| JP | 2010-184487 A | 8/2010 |
| JP | P2012-139967 A | 7/2012 |

* cited by examiner

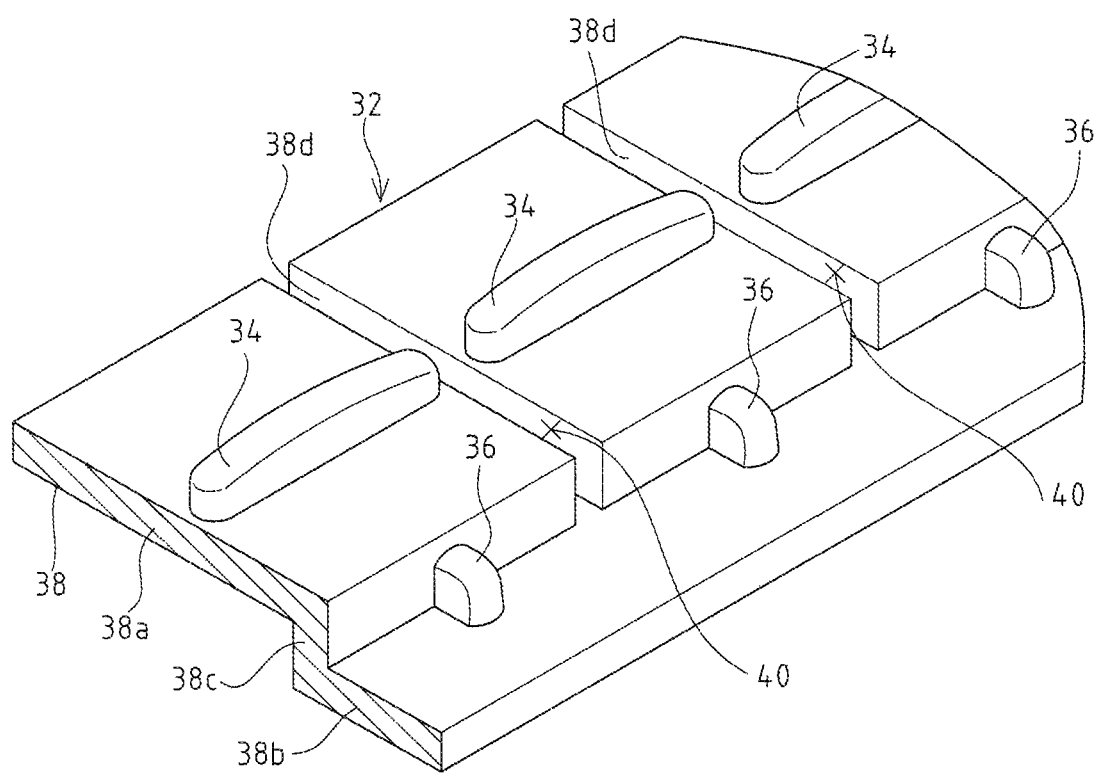

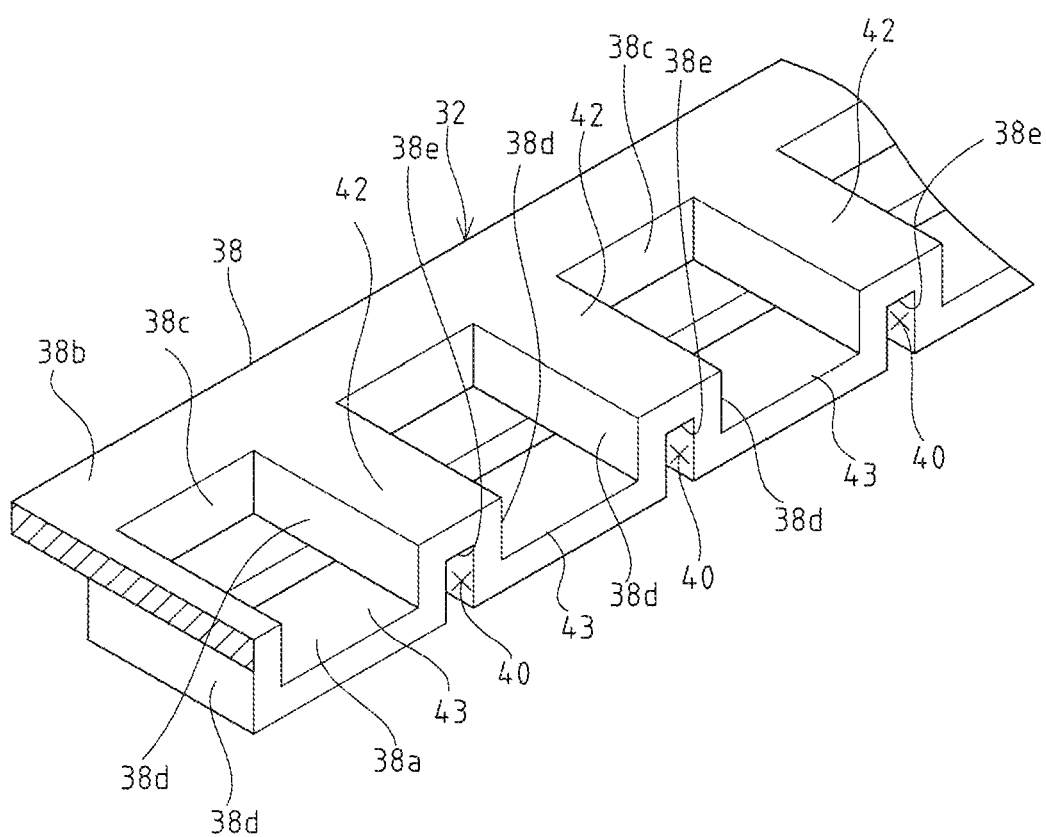

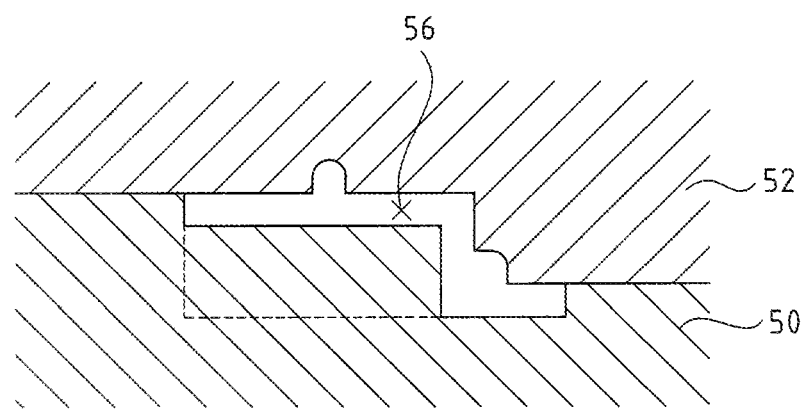
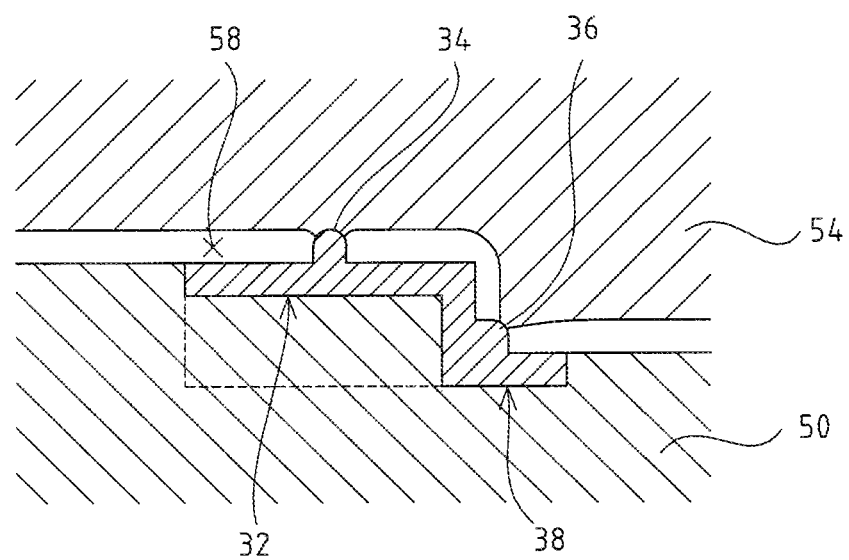

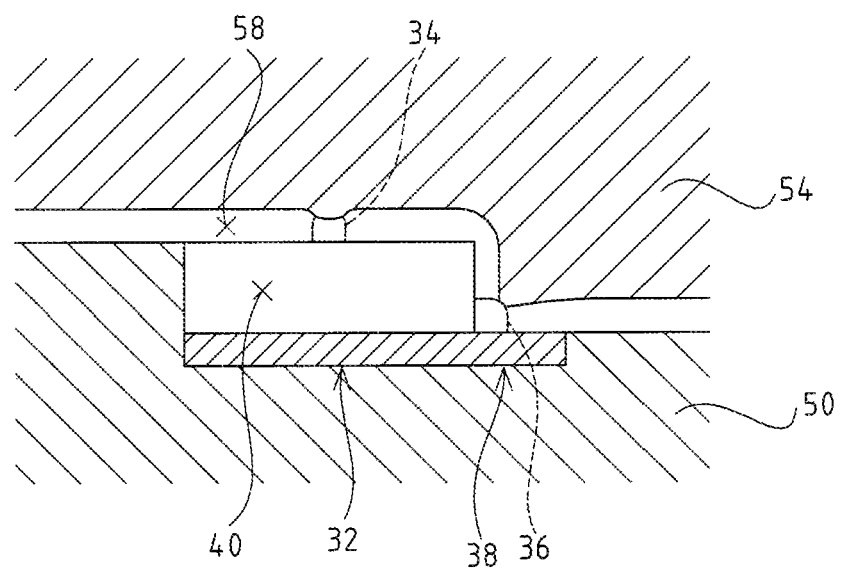

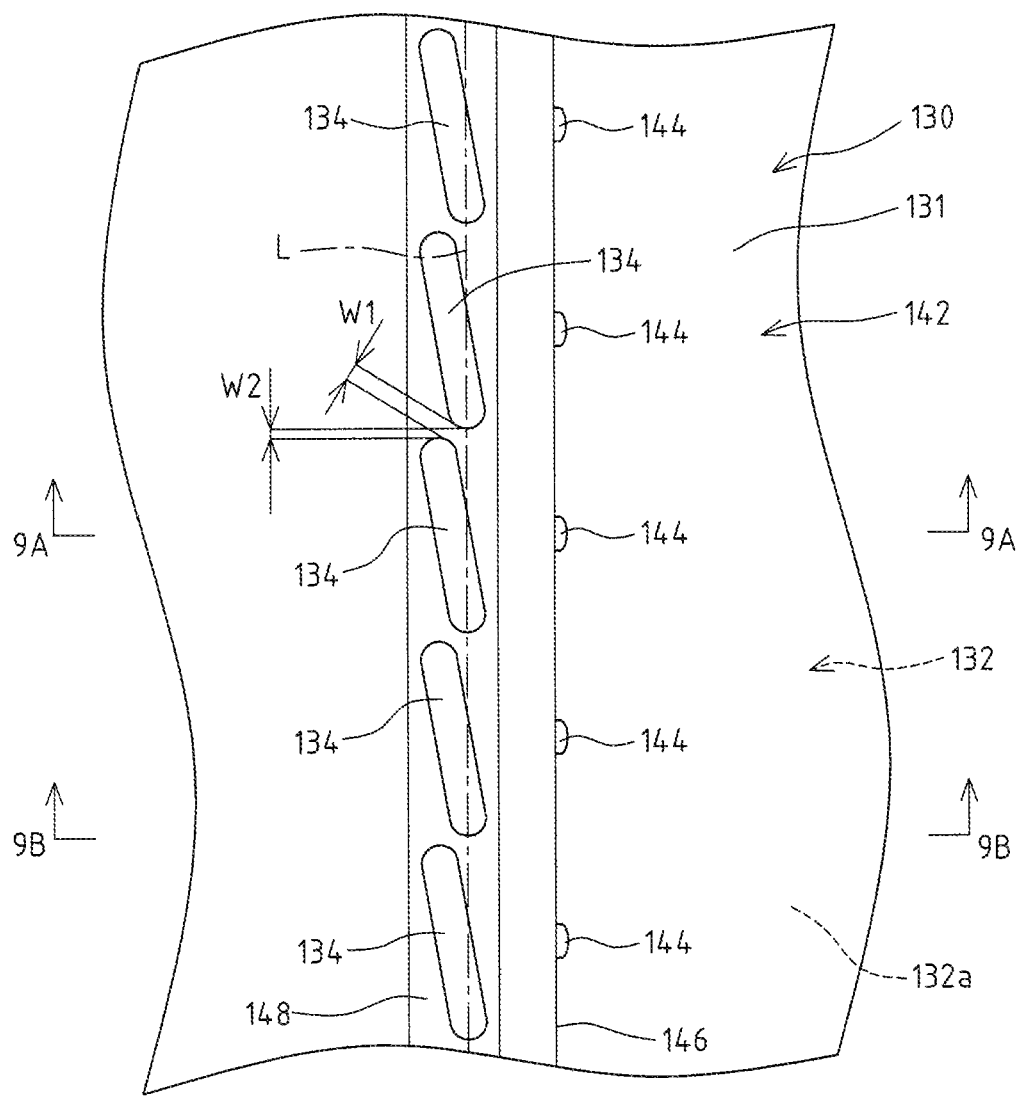

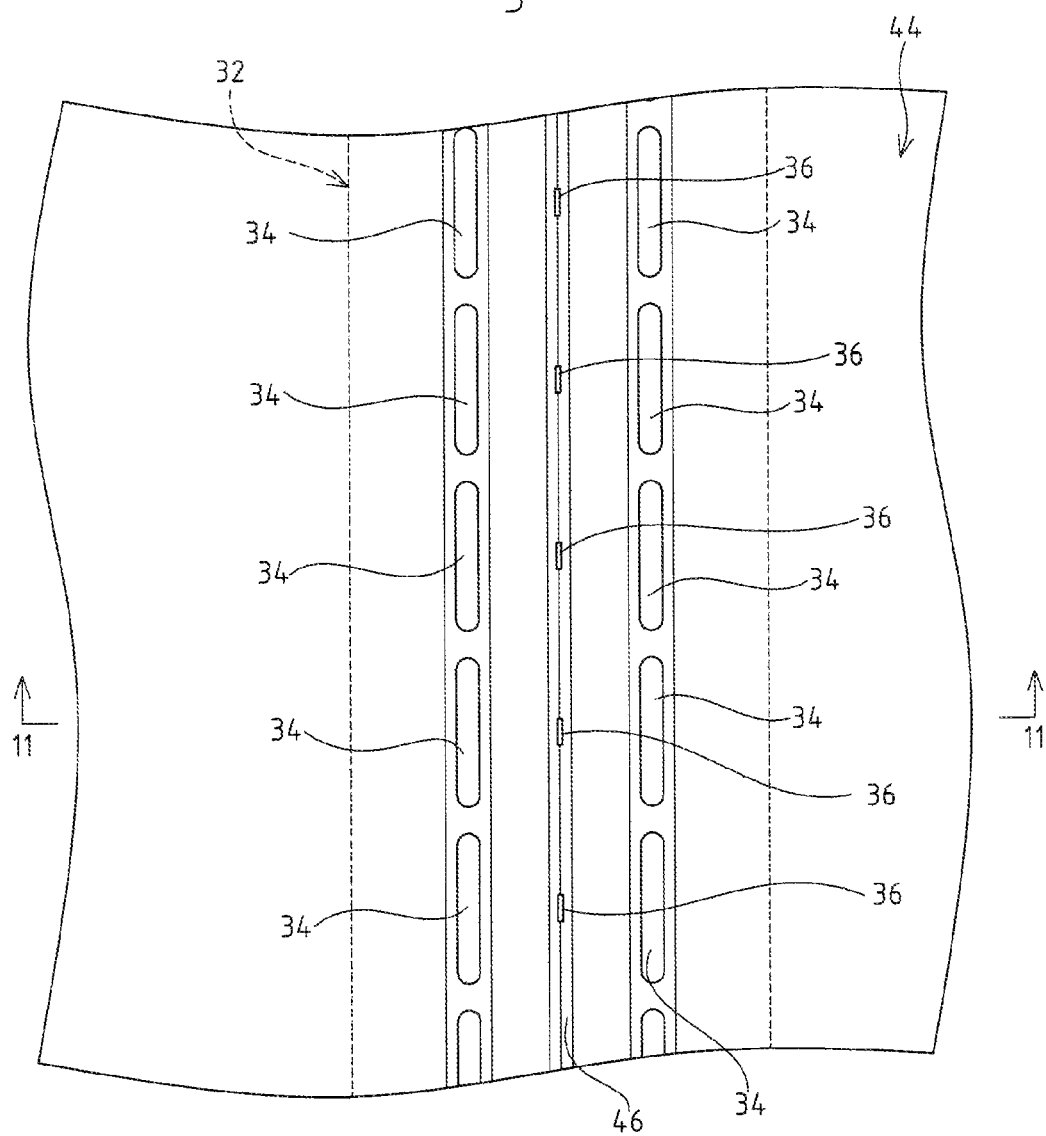

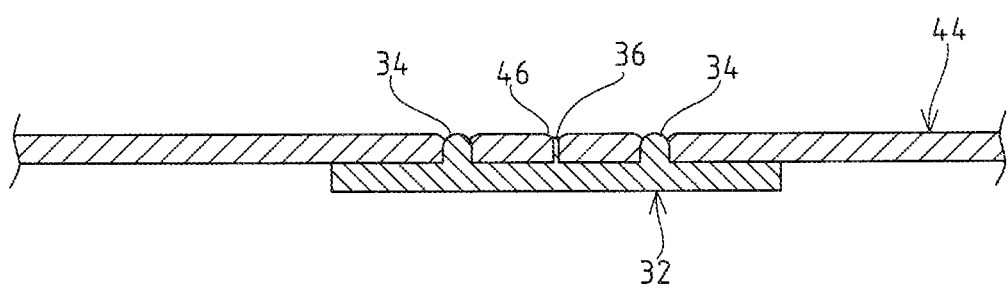

METHOD OF PRODUCING A RESIN MOLDED ARTICLE

BACKGROUND OF THE INVENTION

1. Field of the Invention

The present invention relates to a resin molded article provided with a stitch pattern and a method of producing the same.

2. Description of the Related Art

Some of vehicle interior members (such as an instrument panel and a floor console) disposed in a passenger compartment of an automobile or the like are intended to improve the texture of their design surfaces by seaming a plurality of skin materials, made of genuine leather or a resin sheet molded in imitation of genuine leather, with a thread and disposing them on a surface of the base member of, for instance, the instrument panel.

There are various methods of seaming skin pieces of vehicle interior members, and, for example, there is a method called single-stitch. In this method, as seen from FIG. 12A, two sheets of the skin material 10 are seamed together with a thread 12 in the end edge portions in an overlapped state, and one of the skin material 10 is folded back at this seamed portion and then, as seen from FIG. 12B, the resulted triple folded skin material 10 is further seamed together with the thread 12. As seen from FIG. 12B, on the design surface 14 of the skin material 10 seamed by single-stitch, a stitch pattern is made so that a stitch (out-stitch) 18 appears on the upper side of the skin material 10 along the joint 16 of the two sheets of the skin materials 10 and so that a stitch (in-stitch) 20 slightly appears from the joint 16 formed like a step.

In addition, in a method called double-stitch, two sheets of the skin materials 10 are, as seen from FIG. 12A, seamed together with a thread 12 in the end edge portions in an overlapped state, and both skin materials 10 are folded back away from each other at this seamed portion and, then as seen from FIG. 13, the double overlapped skin materials 10 are respectively seamed together with the thread 12. As illustrated in FIG. 13, on the design surface 14 of the skin material 10 seamed by double-stitch, a stitch pattern is made so that a pair of stitches (out-stitch) 18 appear on both sides of the joint 16 of the two sheets of the skin materials 10 and along the joint 16 and further so that a stitch (in-stitch) 20 slightly appears from the concave joint 16.

However, since seaming the skin materials 10 requires cost and effort, such a vehicle interior member that has a stitch pattern produced by molding is proposed as disclosed in Patent Document 1 below. When producing such a stitch pattern by molding, injection molding or the like is carried out using a molding die having concave and convex portions in a shape of a reversed stitch pattern on the mold surface, thereby integrally forming a stitch pattern on the surface of the resultant skin material.

Patent Document 1: Japanese Patent Application Laid-Open (Kokai Publication) No. 2010-184487

In the method of producing a member provided with a stitch pattern disclosed in Patent Document 1, stitches of the stitch pattern are formed from a part of the resin material that forms a skin material. Accordingly, the stitches naturally has the same color as the surface of the skin material and are thus inconspicuous, and the problem is that the stitch pattern does not look like genuine stitch patterns.

SUMMARY OF THE INVENTION

In view of the problems according to the conventional technique, the present invention is to solve the problems appropriately, and it is an object of the present invention to provide a resin molded article having a stitch pattern that looks genuine stitch pattern and a method of producing the same.

To overcome the problems and achieve the intended object, the invention of the present application provides a resin molded article with a stitch pattern formed on a design surface thereof, and this resin molded article comprises a first member on which a plurality of thread stitch portions protruding on the design surface are formed in alignment and, a second member that covers the first member with the protruding ends of the thread stitch portions exposed, and in this structure, the surface of the second member constituting the design surface and the protruding ends of the thread stitch portions exposed from the second member are in colors different from each other, and the stitch pattern is formed by the plurality of thread stitch portions exposed from the second member.

According to the present invention, therefore, since the stitch pattern is formed by the thread stitch portions of the first member that are exposed from the second member constituting the design surface, improvement in the degree of freedom for combination of colors and materials and the like between the thread stitch portions and the second member constituting the peripheral portions of the thread stitch portions can be provided. Accordingly, it is possible to give the stitch pattern a more genuine appearance.

In the present invention, the second member can be provided on a surface thereof with a joint portion imitating a joint of skin materials joined together, and the stitch pattern can be provided with out-stitches formed by the thread stitch portions aligned along the joint portion. Accordingly, the joint portion and the thread stitch portions can be formed in imitation of a joint and stitches formed by actual leather and the like seamed together, and thus the stitch pattern may have an even more genuine appearance.

Furthermore, in the present invention, the stitch pattern can be provided with in-stitches formed by the thread stitch portions exposed in alignment with the joint portion. Accordingly, since there are in-stitches formed by aligning the thread stitch portions to be exposed on the joint portion, the stitch pattern may have an even more genuine appearance.

Further, in the present invention, the first member can be provided with a base portion formed such that the adjacent thread stitch portions are separated from each other, and a slit extending to cross the alignment direction of the plurality of thread stitch portions and opening in the protruding direction of the thread stitch portions between the adjacent thread stitch portions in the base portion, and a part of the second member is inserted into this slit. Accordingly, while the plurality of thread stitch portions exposed on the front side of the second member are aligned in a manner to divide the second member, the second member is configured to be inserted into the slits of the first member provided between the adjacent thread stitch portions. Thus, it is possible to secure an appropriate thickness for the second member and maintain the strength of the second member.

In addition, in the present invention, the joint portion is can be formed like a step to create a difference in height in the design surface, the out-stitches can be provided on one design surface side raised higher than the other design surface side across the joint portion, and the in-stitches can be provided at a boundary location between the other design surface side and the joint portion. Accordingly the joint portion and the thread stitch portions can be formed in imitation of a joint and stitches formed by actual leather and the like seamed together, and thus the stitch pattern may have an even more genuine appearance.

Furthermore, in the present invention, the plurality of thread stitch portions constituting the out-stitches can be formed obliquely aligned to a line along the joint portion. Accordingly, since each of the thread stitch portions is obliquely provided with reference to the stitch line along the joint portion, relative intervals between the adjacent thread stitch portions can be secured even when the intervals of the adjacent thread stitch portions are narrowed in a direction along the stitch line. This can reduce the limitations on the molding dies for molding the first member and the thread stitch portions, and it is possible to secure a space for the resin for forming the second member to flow between adjacent thread stitch portions. Furthermore, since it is possible to make the intervals of the adjacent thread stitch portions narrower in a direction along the stitch line, it is possible to give the stitch pattern representing stitches a more genuine appearance by the plurality of thread stitch portions.

To overcome the problems and achieve the intended objects, the invention of the present application further provides a method of producing a resin molded article provided with a stitch pattern formed on a design surface thereof, and this method of the present invention comprises the steps of:

molding a first member having a plurality of thread stitch portions aligned on a front side thereof and protruding on the design surface, molding a second member in a color different from that of the thread stitch portions of the first member so that the second member covers the front side of the first member with protruding ends of the thread stitch portions of the first member exposed, and thus forming the stitch pattern on the design surface by the plurality of thread stitch portions exposed from the surface of the second member that constitutes the design surface.

According to this method of the present invention, the first member having the thread stitch portions to form the stitch pattern is molded and then the second member is molded so that the thread stitch portions are exposed on the design surface. Accordingly, the stitch pattern can be formed with a high degree of freedom in combination of colors and materials and the like between the thread stitch portions and the second member constituting the peripheral portions of the thread stitch portions. Thus, a resin molded article that has a stitch pattern close to a genuine stitch pattern can be obtained by a simple production method.

In the method according to the present invention, the first member and the second member can be integrally molded by two-color molding (double injection molding) using a common die portion that forms the back sides of the first and second members. Thus, according to the present invention, it is possible to eliminate steps of adhesion and assembling of the first member and the second member, and the production cost can be reduced.

Furthermore, in the method of the present invention, when molding the first member, the adjacent thread stitch portions can be formed such that they are separated from one another, and a slit, extending to cross the alignment direction of the plurality of thread stitch portions and opening in the protruding direction of the thread stitch portions, can be formed between the adjacent thread stitch portions, and in addition, when molding the second member, a resin raw material constituting the second member is flowed into the slit of the first member being held in the cavity of a molding die. Accordingly, in the method of the present invention, it is possible to flow the resin raw material via the slits provided in the first member and the space between the thread stitch portions into the space sandwiching the thread stitch portions, and thus the resin raw material can fill within the cavity quickly with no space left unfilled. This enables to obtain a resin molded article of high quality.

In addition, in the method of the present invention, when molding the first member, engaging portions in a concave or convex shape can be formed on the back side of the first member such that they correspond to the thread stitch portions, and the second member is molded in a state where the engaging portions are engaged with a die portion that has molded the back side of the first member. Accordingly, according to the method of the present invention, since the first member is held in the die portion by engaging the back side of the first member with the engaging portions formed to correspond to the thread stitch portions, it is possible to prevent the first member and the thread stitch portions of the first member and portions of the die sealing for the thread stitch portions from being misaligned upon molding the second member.

As seen from the above, according to the resin molded article of the present invention, it is possible to give a stitch pattern on a resin molded article a more genuine appearance, and according to the method of producing a resin molded article of the present invention, it is possible to easily form a stitch pattern close to genuine stitch pattern on a resin molded article.

BRIEF DESCRIPTION OF THE DRAWINGS

FIG. 5 is a schematic perspective view illustrating the principal part cut out and shown from the front side of a first member of the First Embodiment.

FIG. 6 is a schematic perspective view illustrating the principal part cut out and shown from the back side of the first member of the First Embodiment.

FIGS. 7A, 7B, and 7C are explanatory cross-sectional views illustrating a process of manufacturing an instrument panel by two-color molding, where FIG. 7A illustrates a step of molding the first member, FIG. 7B illustrates a step of molding a second member viewed at a position corresponding to the line 3A-3A in FIG. 2, and FIG. 7C illustrates the step of molding the second member viewed at a position corresponding to the line 3B-3B in FIG. 2.

FIG. 8 is a schematic plan view illustrating the principal part of an instrument panel of Second Embodiment.

FIG. 10 is a schematic plan view illustrating a modification of the stitch pattern.

FIG. 11 is a cross-sectional view taken along the line 11-11 in FIG. 10.

DETAILED DESCRIPTION OF THE INVENTION

Next, a description is given below for a resin molded article and a method of producing the same according to the present invention by way of preferred embodiments with reference to the attached drawings.

Figure 1:
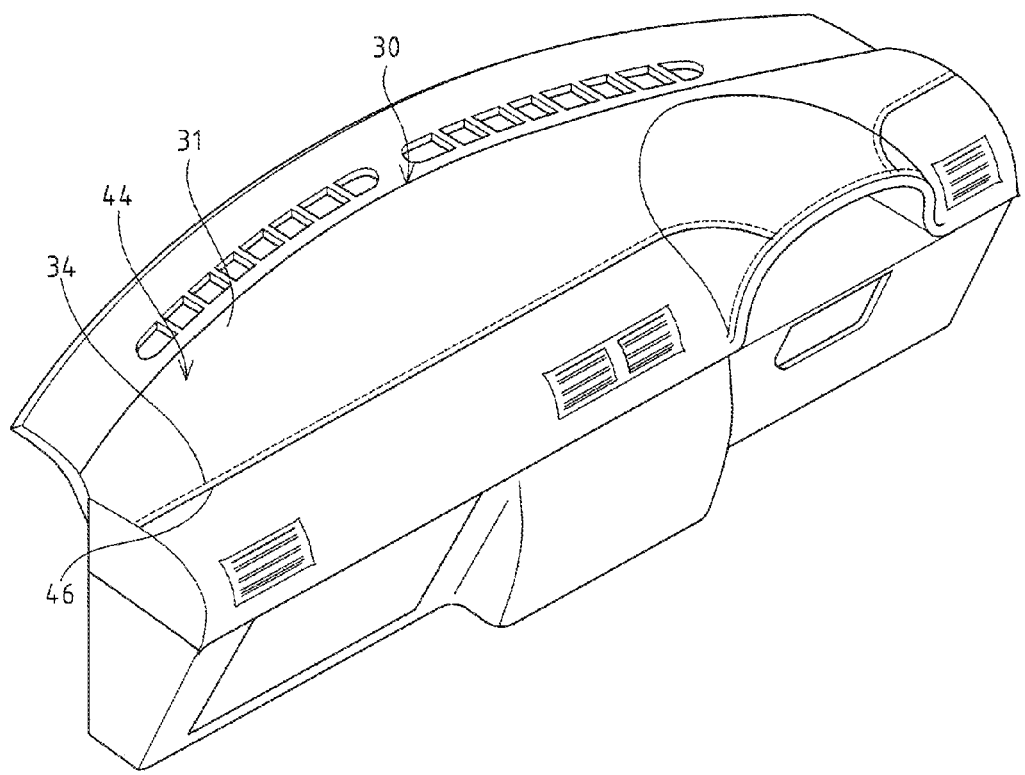
FIG. 1 is a schematic perspective view illustrating an instrument panel according to preferred First Embodiment of the present invention.

In the embodiments, a description is given for an instrument panel 30 illustrated in FIG. 1, which is one of vehicle's interior members and is a resin molded article. In the following description of the instrument panel (resin molded article) 30, a side to serve as a design surface 31 is referred to as a front side, and a side on which another member is mounted or a side to be hidden by another member is referred to as a back side. For example, in the case of such a vehicle interior member as the instrument panel 30, the passenger compartment side of the design surface 31 is the front side, and the vehicle body side thereof to which the vehicle interior member is mounted is the back side.

First Embodiment

Figure 2:
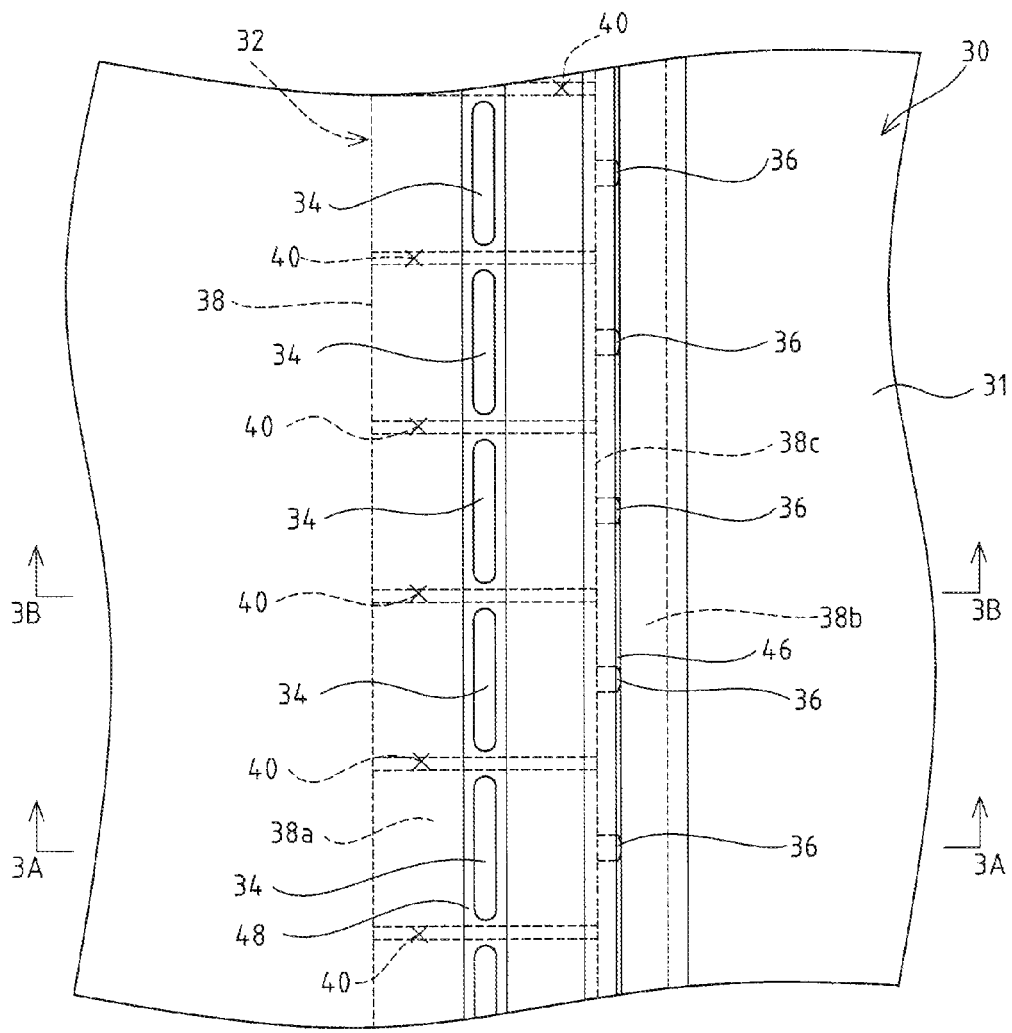
FIG. 2 is a schematic plan view illustrating the principal part of the instrument panel of the First Embodiment.
Figure 12A:
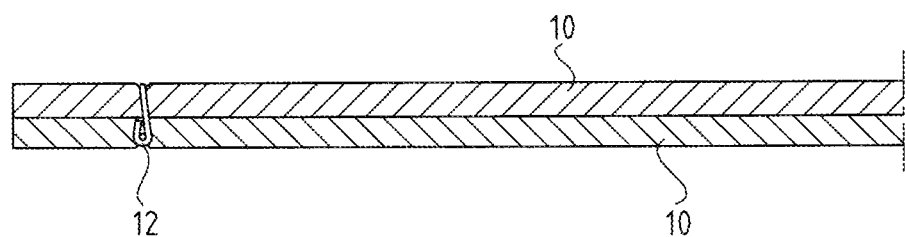
FIG. 12A is an explanatory cross-sectional view illustrating a state where two sheets of a skin material are seamed with a thread to be an in-stitch and FIG. 12B is an explanatory cross-sectional view illustrating a state where the skin materials are connected by a so-called single-stitch.
Figure 12B:
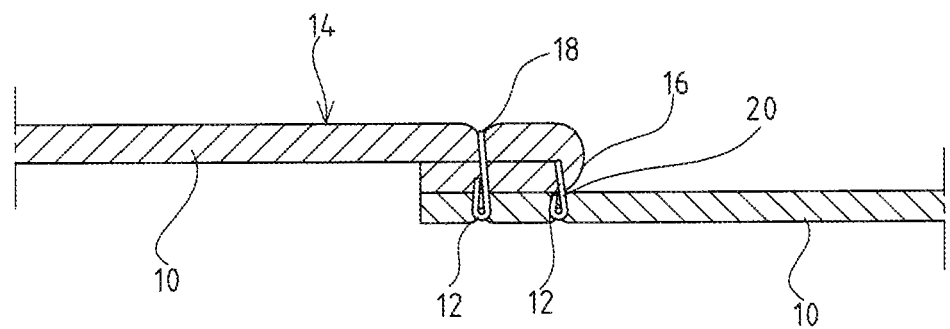
Figure 13:
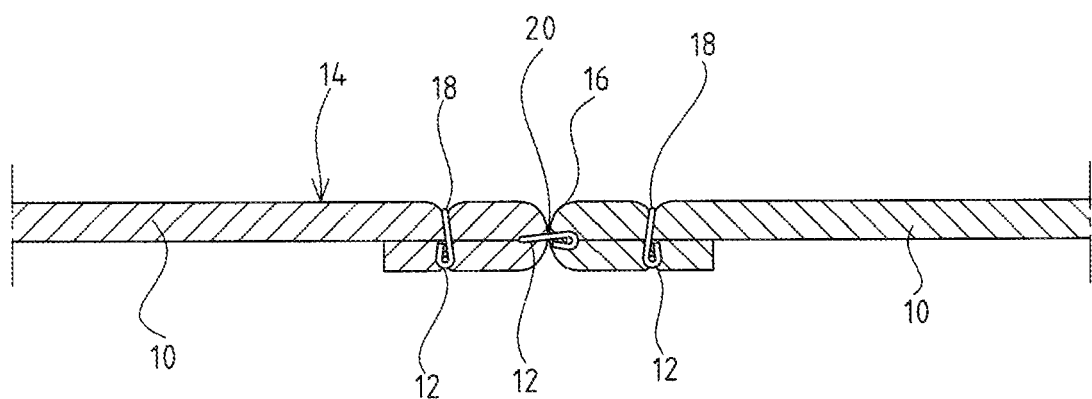
FIG. 13 is an explanatory cross-sectional view illustrating a state where skin materials are connected by a so-called double-stitch.

As illustrated in FIGS. 2, 3A and 3B, the instrument panel 30 comprises a first member 32, having a plurality of thread stitch portions 34 and 36 integrally formed therein, and a second member 44 having a surface that makes the design surface 31 of the instrument panel 30. The instrument panel 30 is formed such that the protruding ends of the plurality of thread stitch portions 34 and 36 are exposed on the front side of the second member 44, and that the thread stitch portions 34 and 36 and the surface of the second member 44 are formed in colors different from each other. In other words, in the instrument panel 30, colors of the thread stitch portions 34 and 36 that imitate thread 12 (see FIGS. 12A, 12B and 13) for seaming a skin material, such as genuine leather and artificial leather, are chosen so as to correspond to the color of the thread 12, and the color of the surface of the second member 44 that imitates the skin material is chosen so as to correspond to the skin material. Thus, an artificial stitch pattern is formed on the design surface 31 of the instrument panel 30 by the plurality of thread stitch portions 34 and 36 exposed from the second member 44 constituting most of the design surface 31 that faces the passenger compartment (see FIG. 1).

Figure 3:
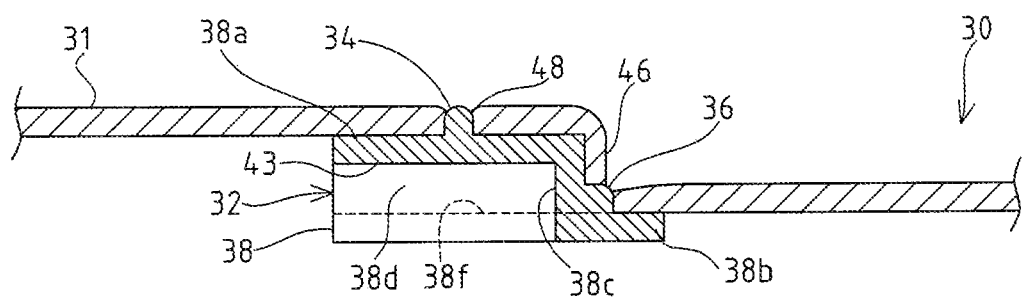
FIG. 3A is a cross-sectional view taken along the line 3A-3A in FIG. 2.
FIG. 3B is a cross-sectional view taken along the line 3B-3B in FIG. 2.
Figure 3:
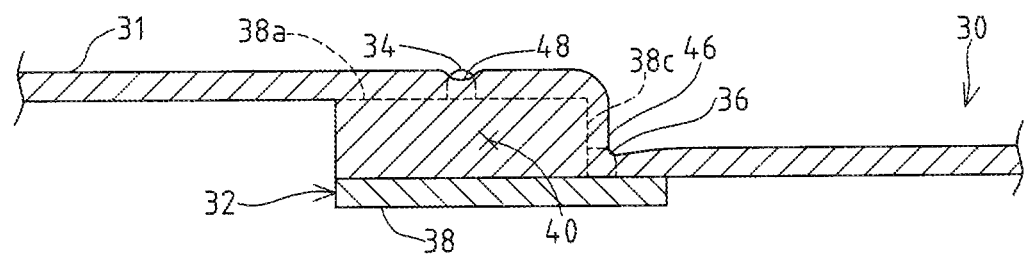
Figure 4:
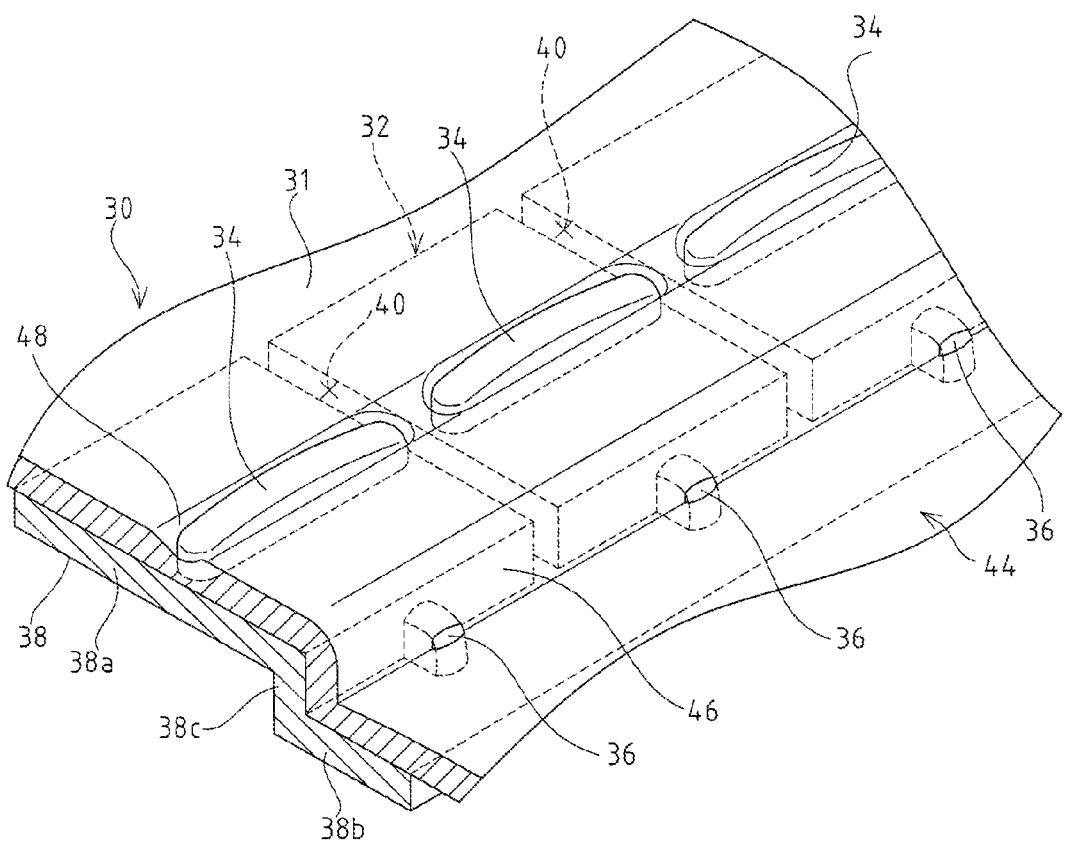
FIG. 4 is a schematic perspective view illustrating the cut-out principal part of the instrument panel of the First Embodiment.

As illustrated in FIGS. 2 through 4, an artificial joint representing a connecting portion of the skin materials to each other is formed in the instrument panel 30 by a joint portion 46 formed on the surface of the second member 44. In addition, in the instrument panel 30, out-stitches extending along the joint portion 46 is formed by the plurality of first thread stitch portions 34 formed in the first member 32. Furthermore, in the instrument panel 30, in-stitches exposed on the joint portion 46 are formed by the plurality of second thread stitch portions 36 formed in the first member 32. In this manner, the instrument panel of the First Embodiment is provided with a stitch pattern that imitates single-stitch.

A variety of materials can be employed for forming the first member 32 and the second member 44. For example, it is possible to form the first member 32 and the second member 44 using a same material including polypropylene (PP), polyethylene (PE), and an elastomer such as TPO (olefin-based elastomer) and a foam such as polyurethane, or they can be formed using different materials in combination. In the First Embodiment, the first member 32 is made of polypropylene and the second member 44 is made of TPO. Regarding the colors of the first member 32 and the second member 44, it is preferred that the materials themselves forming the first member 32 and the second member 44 be colored.

The first member 32 is provided so as to correspond at least to a location where the stitch pattern is formed. The first member 32 of the First Embodiment is formed in a strip that has a width narrower than that of the second member 44, and it extends in the back side of the second member 44 in a minimum range corresponding to the location where the stitch pattern is formed. The first member 32 comprises a base portion 38 having a front side covered by the second member 44 and the plurality of thread stitch portions 34 and 36 formed on the surface of this base portion 38 (see FIGS. 2 through 5). The base portion 38 is formed like a step shape (see FIG. 5). More specifically, the base portion 38 comprises a first step portion 38a projecting to the front side, a second step portion 38b receding to the back side farther than the first step portion 38a, and a connecting portion 38c connecting the first step portion 38a and the second step portion 38b. In the first member 32, the plurality of first thread stitch portions 34 constituting out-stitches are formed on the first step portion 38a of the base portion 38 along the joint portion 46 of the second member 44. In addition, in the first member 32, the second thread stitch portions 36 constituting in-stitches are formed at a boundary location between the second step portion 38b and the connecting portion 38c in the base portion 38 so as to correspond to and to be exposed from the joint portion 46 of the second member 44.

As illustrated in FIG. 5, the first thread stitch portions 34 and the second thread stitches 36 are formed so as to protrude from the surface of the base portion 38 towards the front side. The plurality of first thread stitch portions 34 are disposed on the surface of the first step portion 38a of the base portion 38 so as to be at positions separated from the boundary location between the first step portion 38a and the connecting portion 38c, and these first thread stitch portions 34 are aligned in line in a state that they are separated from one another along the boundary location. The respective first thread stitch portions 34 are formed linearly, in the plan view of FIG. 2, and longitudinally extend along the alignment direction of the plurality of thread stitch portions 34 (hereinafter, simply referred to as the "alignment direction"). The plurality of second thread stitch portions 36 are aligned in line in a state that they are separated from one another along the boundary location between the second step portion 38b and the connecting portion 38c of the base portion 38. More specifically, in the first member 32, the plurality of first thread stitch portions 34 and the plurality of second thread stitch portions 36 are aligned in parallel. Each second thread stitch portion 36 is a small projection with a lengthwise dimension in the alignment direction being smaller than that of the first thread stitch portion 34, and one second thread stitch portion 36 is provided so as to one first thread stitch portion 34. In the First Embodiment, each second thread stitch portion 36 is disposed at a position that corresponds to the center in the alignment direction of the corresponding first thread stitch portion 34 in a direction orthogonal to the alignment direction (hereinafter, referred to as the "width direction"). In addition, in the protruding ends of the first thread stitch portions 34 and the second thread stitch portions 36, fine bumps (not shown) imitating twists of a thread are formed.

As illustrated in FIG. 5, the first member 32 has slits 40 formed between two adjacent first thread stitch portions 34 in the base portion 38. In the first member 32 of the First Embodiment, a slit 40 is provided for each space between the adjacent first thread stitch portions 34. Each of the slits 40 is positioned between the two adjacent first thread stitch portions 34 in the base member 38, and is formed extending in the width direction (a direction crossing the alignment direction of the plurality of first thread stitches 34) and also opening in the protruding direction of the first thread stitch portions 34. Each slit 40 is configured to extend greater than the width dimension of the first thread stitch 34, and is formed to extend not only between the adjacent first thread stitch portions 34 but also on both sides outward from the first thread stitch portion 34 in the width direction. The slit 40 is formed in a groove shape extending in the entire width direction of the first step portion 38a of the base portion 38 and recessing towards the back side, and the first step portion 38a and the connecting portion 38c are divided by the slits 40. More specifically, as shown in FIGS. 5 and 6, each slit 40 is defined by a pair of wall portions 38d, which are formed to project out from the first step portion 38a and the connecting portion 38c towards the back side and disposed to face each other in the alignment direction, and by a bottom portion 38e, which connects the bottom of these wall portions 38d and continues to the back side of the second step portion 38b.

As seen from FIG. 6, in the back side of the first member 32, convex portions (engaging portions) 42 protruding from the first step portion 38a towards the back side are formed by the pair of wall portions 38d and the bottom portion 38e defining the slits 40. In the back side of the first member 32, concave portions (engaging portions) 43 recessed towards the front side farther than the second step portion 38b are formed between the adjacent convex portions 42 corresponding to the positions to form the first thread stitch portions 34. The engaging portions, in other words, the convex portions 42 and the concave portions 43, constitute portions in the first member 32 to be fitted into the molding surface of a common die portion 50 when setting the first member 32 in the common die portion 50 during the fabrication process to be described later, and thus the engaging portions 42 and 43 contribute to positioning/fixation of the first member 32. The first member 32 is comprised of each one of the parts, including the thread stitch portions 34 and 36 and the base portion 38, that are integrally formed into a single unit by die molding, and it has a same color as a whole.

The second member 44 is formed in a suitable shape to match the design shape of the instrument panel 30. In the second member 44, as seen from FIGS. 3A, 3B and 4, the joint portion 46 is formed like a step to create a difference in height on the design surface 31 of the instrument panel 30. Here, the joint portion 46 of the second member 44 is formed to match the step height of the base portion 38 of the first member 32. In addition, on the surface of the second member 44, sunken portions 48 recessing toward the first thread stitch portion 34 are formed at locations around the first thread stitch portions 34 of the first member 32 so as to be exposed on the front side of the second member 44. With the sunken portions 48, the instrument panel 30 appears as if the second member 44 is compressed by the first thread stitch portions 34. Furthermore, on the surface of the second member 44, a pattern, such as surface texturing, is formed as needed. The instrument panel 30 is provided such that the first thread stitch portions 34 are exposed on one of the design surface 31 (first design surface) sides raised higher than the other design surface 31 (second design surface) side across the joint portion 46. In addition, the instrument panel 30 is provided such that the second thread stitch portions 36 are exposed at the boundary location between the second design surface 31 and the joint portion 46. In the instrument panel 30, portions of the second member 44 are inserted into the slits 40 of the first member 32, and the second member 44 is formed with the portions corresponding to between the adjacent first thread stitch portions 34 and 34 and the portions inserted into the slits 40 included.

Next, a description is given for a method of producing the instrument panel 30 of the First Embodiment.

In the First Embodiment, the instrument panel 30 having the first member 32 and the second member 44 is produced by two-color molding (double injection molding). In other words, as can be seen from FIGS. 7A, 7B, and 7C, a molding machine used for manufacturing the instrument panel 30 of the First Embodiment comprises, for example, a common die portion 50 movably disposed between a first position and a second position, a primary die portion 52 disposed to oppose the common die portion 50 at the first position and moving back and forth with respect to the common die portion 50, and a secondary die portion 54 disposed to oppose the common die portion 50 at the second position and moving back and forth with respect to the common die portion 50.

By die-closing the common die portion 50 and the primary die portion 52, as seen from FIG. 7A, a first cavity 56 corresponding to (or for molding) the first member 32 is defined between the common die portion 50 and the primary die portion 52. In other words, the back side of the first member 32 is defined by the mold surface of the common die portion 50, whereas the front side of the first member 32 is determined by the primary die portion 52. Subsequently, a first resin raw material, which is the material to form the first member 32, is injected into the first cavity 56. Then, the first resin raw material is cured in the first cavity 56, thereby molding the first member 32 in the shape described above. More specifically, the first member 32 has on the front side the plurality of thread stitch portions 34 and 36 protruding on the side which constitutes the design surface 31 of the instrument panel 30, and also has in the base portion 38 the slits 40 and the engaging portions 42 and 43. Here, by mixing a predetermined coloring material into the first resin raw material, the first member 32 thus obtained is in a color that matches the stitches of a stitch pattern as a whole including the thread stitch portions 34 and 36. In the molding surface corresponding to the thread stitch portions 34 and 36 in the primary die portion 52, concavities and convexities in fine streaks (not shown) are provided to give twists to the thread stitch portions 34 and 36 at the same time when molding the first member 32.

The primary die portion 52 is next moved to be separated from the common die portion 50, thereby leaving the first member 32 on the common die portion 50 due to the engagement between the engaging portions 42 and 43 and the molding surface. The common die portion 50 is then moved and disposed so as to face the secondary die portion 54 to die-close the common die portion 50 and the secondary die portion 54, thereby defining a second cavity 58 matching the second member 44 between the common die portion 50 and the secondary die portion 54. At this time, as seen from FIGS. 7B and 7C, the back side of the first member 32 remains held by the molding surface of the common die portion 5, and the front side of the second member 44 is defined by the secondary die portion 54 and also the protruding ends of the thread stitch portions 34 and 36 are sealed with the molding surface of the secondary die portion 54. Here, in the first member 32, the engaging portions 42 and 43 are formed in the back side of the base portion 38 at the same time when molding the first member 32, and the concavities and convexities of the engaging portions 42 and 43 are fitted into the concavities and convexities of the molding surface of the common die portion 50. Therefore, even if vibrations or the like occur when the primary die portion 52 is opened, when the common die portion 50 is moved, or when the secondary die portion 54 is closed, it is possible to prevent the first member 32 from coming off or misaligned due to the engagement between the engaging portions 42 and 43 and the molding surface of the common die portion 50. In addition, the engaging portions 42 and 43 formed to correspond to the thread stitch portions 34 suppresses the contraction of the first member 32 occurring after opening the primary die portion 52, so that it is possible to prevent the thread stitch portions 34 from being misaligned with respect to the secondary die portion 54 when molding the second member 44.

Into the second cavity 58, a second resin raw material, which is a material to form the second member 44, is next injected. At this time, as seen from FIG. 7C, since the second resin raw material flows into the slits 40 provided in the first member 32, it is possible to fill the second resin raw material into the second cavity 58 quickly with no space left unfilled. This prevents generation of molding defects, such as void, in the second member 44 thus obtained and production of the instrument panel 30 of high quality.

Then, the second resin raw material is cured in the second cavity 58, thereby molding the second member 44 in the shape described above. More specifically, the protruding ends of the thread stitch portions 34 and 36 are sealed by the molding surface of the secondary die portion 54; and as a result, end portions of the thread stitch portions 34 and 36 are exposed on the front side of the second member 44 and the front side of the first member 32 is covered with the second member 44. Upon injection of the second resin raw material, by mixing a predetermined coloring material into the second resin raw material, the second member 44 obtained is in a color that matches the design surface 31 of the instrument panel 30. In the molding surface corresponding to the thread stitch portions 34 and 36 in the secondary die portion 54, concavities and convexities in fine streaks (not shown) are provided, so that when sealing the protruding ends of the thread stitch portions 34 and 36, the concavities and convexities of the protruding ends created during molding of the first member 32 fit into the concavities and convexities in the molding surface of the secondary die portion 54 and they are tightly sealed.

In the instrument panel 30 of the First Embodiment, the first member 32 that has the thread stitch portions 34 and 36 forming the stitch pattern is a member separate from the second member 44 that constitutes the design surface 31 of the instrument panel 30. The front side of the first member 32 is covered by the second member 44 so that the protruding ends of the thread stitch portions 34 and 36 are exposed on the front side of the second member 44 to form an artificial stitch pattern in combination with the protruding ends of the thread stitch portions 34 and 36 exposed on the design surface 31 side and the surface shape of the second member 44 constituting the peripheral portions of the thread stitch portions 34 and 36. When stitches are integrally molded with a member that constitutes the design surface 31 of the instrument panel 30 it is not possible to change the colors between the design surface 31 and the stitches and also not possible to change the texture between the stitches and the design surface 31 like, for example, making the design surface 31 soft while making the stitches hard. According to the instrument panel 30 of the First Embodiment, however, since the first member 32 and the second member 44 are different members, there is a high degree of freedom for color settings of the respective members 32 and 44 (the thread stitch portions 34 and 36 and the surface of the second member 44), selection of materials for the thread stitch portions 34 and 36 and the peripheral portions of the thread stitch portions 34 and 36, and the like. In other words, as seen from the First Embodiment, by forming the first member 32 and the second member 44 with resin materials in different colors, it is possible to easily make the thread stitch portions 34 and 36 and the surface of the second member 44 in different colors. Similarly, by forming the first member 32 and the second member 44 with resin materials of, for example, different hardness, it is possible to easily set the thread stitch portions 34 and 36 and the second member 44 in different textures. Consequently, according to the instrument panel 30 of the First Embodiment, it is possible to give a stitch pattern a more genuine appearance. Furthermore, the instrument panel 30 has the step-like joint portion 46, the plurality of first thread stitch portions 34 constituting out-stitches, and the plurality of second thread stitch portions 36 constituting in-stitches formed so as to imitate a joint and stitches formed when leather and the like are actually seamed together. Accordingly, it is possible to give a stitch pattern an even more genuine appearance.

In the instrument panel 30, intervals between the plurality of first thread stitch portions 34 exposed on the front side of the second member 44 are narrow and aligned so that it looks as if the first thread stitch portions 34 divide the second member 44. Since the second member 44 is configured to be inserted into the slits 40 of the first member 32 that are provided between the adjacent thread stitch portions 34 and 34, it is possible to secure a thickness of the second member 44 and to keep the strength of the second member 44.

The instrument panel 30 is manufactured by molding the first member 32 having the thread stitch portions 34 and 36 and molding the second member such that the thread stitch portions 34 and 36 are exposed on the design surface 31 side. In other words, the first member 32 and the second member 44 are molded in different molding steps, so that there is a high degree of freedom for selection of colors, materials, and the like respectively for the thread stitch portions 34 and 36 and the surface of the second member 44. For example, according to the production method of the instrument panel of the First Embodiment, molding of the thread stitch portions 34 and 36 (first member 32) is not restricted by the color, the molding conditions, the resin raw material, and the like of the second member 44, and similarly, molding of the second member 44 is not restricted by the color, the molding conditions, the resin raw material, and the like of the first member 32. Accordingly, in a simple production method, the instrument panel 30 having a stitch pattern close to a genuine stitch pattern can be obtained. In addition, by employing two-color molding, it is possible to eliminate steps of adhesion and assembling of the first member 32 and the second member 44, so that production cost can be reduced. Furthermore, by engaging the common die portion 50 for molding the second member 44 with the engaging portions 42 and 43 formed in advance in the first member 32 when molding the first member 32, the first member 32 is held therein, so that it is possible to prevent the first member 32 from being misaligned with respect to the second member 44. In other words, in the instrument panel 30 thus obtained, the thread stitch portions 34 and 36 are exposed on the front side precisely with respect to the joint portion 46.

Second Embodiment

An instrument panel 130 according to the Second Embodiment of the present invention shown in FIGS. 8, 9A, and 9B has a basic configuration similar to that of the First Embodiment. In the instrument panel 130, most of a design surface 131 is configured with a surface of a second member 142, and outstitches are formed by first thread stitch portions (thread stitch portions) 134 formed in a first member 132 and exposed from the second member 142 on the front side. In the Second Embodiment, second thread stitch portions (other thread stitch portions) 144 constituting in-stitches facing the joint are integrally formed with the surface of the second member 142. The instrument panel 130, the protruding ends of the first thread stitch portions 134 exposed from the second member 142 on the front side and the surface of the second member 142 are formed in colors different from each other. In other words, in the instrument panel 130, the first thread stitch portions 134 imitating the thread 12 (see FIGS. 12A. 12B and 13) that seams a skin material is set in color that imitates the thread 12 whereas the surface of the second member 142 imitating the skin material is set in color that imitates the skin material.

The materials to form the first member 132 and the second member 142 are the same as those used in the First Embodiment. In the instrument panel 130 as well, the material to form the second member 142 is joined to the first member 132 at the time of molding, and the first member 132 and the second member 142 are as a result integrally formed. In addition, in the instrument panel 130, since the first member 132 and the second member 142 are molded with colored materials as in the First Embodiment, time and effort necessary for coloring after molding are saved.

Figure 9:
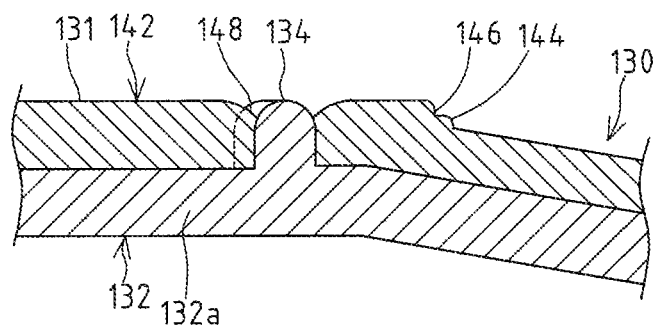
FIG. 9A is a cross-sectional view taken along the line 9C-9C in FIG. 8
FIG. 9B is a cross-sectional view taken along the line 9D-9D in FIG. 8.
Figure 9:
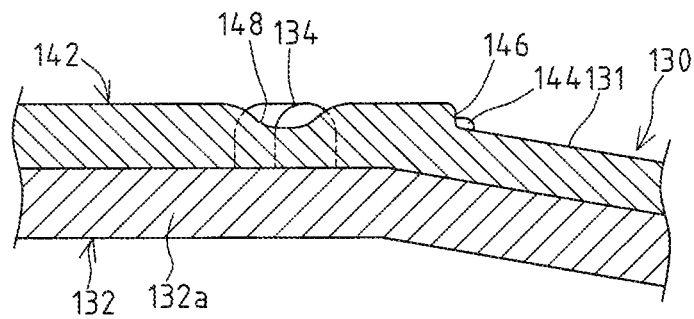

The first member 132 is, as shown in FIGS. 8 through 9B, provided to correspond at least to a location for forming the stitch pattern, and in the Second Embodiment, it constitutes the entire back side of the instrument panel 130. The first member 132 comprises a flat plate base portion 132*a* having the front side covered with the second member 142 and the plurality of first thread stitch portions 134 integrally formed on the front side of this base portion 132*a*. Each of the first thread stitch portions 134 protrudes from the surface of the base portion 132*a* towards the front side, and the protruding ends coming out of the front side of the instrument panel 130 are formed in a short rod shape imitating one of stitches in a plan view. The plurality of first thread stitch portions 134 are aligned such that an imaginary line (thread stitch portion line L) connecting one longitudinal end of each of the first thread stitch portions 134 extends along the joint (joint portion 146) provided in the second member 142. In addition, each first thread stitch portion 134 extends such that the other longitudinal end of each of the first thread stitch portion stitches 134 deviates from the thread stitch portion line L, and the longitudinal side of each first thread stitch portion 134 is oblique with respect to the thread stitch portion line L. Here, the sides deviated from the thread stitch portion line L in the other longitudinal end of the first thread stitch portions 134 are identical, and the directions of the plurality of first thread stitch portions 134 obliquely formed with respect to the thread stitch portion line L are the same.

Furthermore, in the respective two adjacent first thread stitch portions 134, an adjacent interval W1 connecting one longitudinal end of one of the first thread stitch portions 134 and the other longitudinal end of the other (next) first thread stitch portion 134 in the shortest distance is greater than a projection interval W2 between one longitudinal end of one of the first thread stitch portions 134 and the other longitudinal end of the other first thread stitch portion 134 along the thread stitch portion line L. The first thread stitch portions 134 are basically formed in the same length, and also the intervals between the adjacent first thread stitch portions 134 and 134 are basically constant. In the Second Embodiment, the plurality of first thread stitch portions 134 are set to have the same angle of inclination with respect to the thread stitch portion line L, and for example, each first thread stitch portion 134 is inclined to have an angle of intersection to the thread stitch portion line L at approximately 5°. In addition, in the protruding ends of the first thread stitch portions 134, concavities and convexities in fine streaks imitating twists of the thread 12 are formed.

The second member 142 is formed in a suitable shape so as correspond to the design shape of the instrument panel 130. The surface of the second member 142 is, as seen from FIGS. 9A and 9B, provided with the joint portion 146 formed in the shape of a step such that the side where the first thread stitch portions 134 are disposed is higher, and the joint portion 146 continuously extends throughout a given length. In addition, the plurality of second thread stitch portions 144 are, as seen from FIG. 8, positioned at the joint portion 146 and, as seen from FIGS. 9A and 9B, formed integrally therewith. The plurality of second thread stitch portions 144 are disposed in alignment on an extension line of the joint portion 146. Each second thread stitch portion 144 is a projection protruding from the corner on the lower side of the joint portion 146 towards the front side, and each second thread stitch portion 144 is formed with a lengthwise dimension along the extension line of the joint portion 146 smaller than that of the first thread stitch portion 134. In addition, each second thread stitch portion 144 is disposed next to one of the first thread stitch portions 134 and at a position corresponding to the approximately longitudinal center of the corresponding first thread stitch portion 134. Moreover, in the surface of the second member 142, depressed portions 148 recessing as they approach the first thread stitch portions 134 are formed at peripheral locations of the first thread stitch portions 134 exposed on the front side of the second member 142. With depressed portions 148, in the instrument panel 130, the second member 142 appears as if it is compressed by the first thread stitch portions 134.

In the instrument panel 130, the thread stitch portion line L connecting one longitudinal end of each one of the plurality of first thread stitch portions 134 exposed on the design surface 131 is in parallel with the extension line of the joint portion 146. In other words, in the instrument panel 130, the plurality of first thread stitch portions 134 exposed on the design surface 131 are aligned in a line along the joint portion 146, and longitudinal sides of the plurality of first thread stitch portions 134 extend obliquely aligned with respect to this line.

The instrument panel 130 of the Second Embodiment is manufactured in the same method as that of the First Embodiment described with reference to FIGS. 7A, 7B, and 7C, using different molding die from that used in the First Embodiment.

The instrument panel 130 according to the Second Embodiment provides functions and effects similar to those of the First Embodiment. In addition, in the instrument panel 130, since the first thread stitch portions 134 are formed obliquely to the thread stitch portion line L, it is possible to secure the relative adjacent intervals W1 between the adjacent first thread stitch portions 134 and 134 wide even when the intervals W2 of the adjacent first thread stitch portions 134 and 134 are narrowed in a direction along the thread stitch portion line L. The intervals between the adjacent first thread stitch portions 134 and 134 are defined by the convex portion of the primary die portion 52 when molding the first member 132, while the intervals between the first thread stitch portions 134 and 134 can be secured relatively widely as described above, so that it is possible to avoid the convex portion from becoming smaller. This allows lowering of the production cost of the primary die portion 52 and prevents, for instance, the convex portion from being broken. In this manner, it is possible to reduce the limitations of the molding dies for molding the first member 132 and the first thread stitch portions 134 and also to secure a vacant space for a resin to flow for forming the second member 142, between adjacent first thread stitch portions 134 and 134. Furthermore, since it is possible to narrow the intervals W2 of the adjacent first thread stitch portions 134 and 134 in a direction along the thread stitch portion line L, it is possible to give the stitch pattern representing stitches a more genuine appearance by the plurality of first thread stitch portions 134.

Modifications

The present invention is limited to the configurations of the embodiments described above, and the configurations can be modified, for example, as follows:

(1) While a stitch pattern imitating single-stitch is described in the embodiments above, the stitch pattern can be one imitating double-stitch as illustrated in FIGS. 10 and 11 or other stitch patterns. In addition, the stitch pattern may be out-stitches only, may be provided with a joint or not provided with in-stitches, and may also not be provided with a joint.

(2) In a modification illustrated in FIGS. 10 and 11, first thread stitch portions 34 are formed in two rows to project on the front side of the first member 32 on both sides of a joint portion 46 which is formed in a groove shape in the surface of the second member 44, and these two rows of first thread stitch portions 34 are exposed on the front side of the second member 44. The joint portion 46 is formed in a tapered shape in the depth direction. In addition, second thread stitch portions 36 are formed in one row to project on the front side of the first member 32 and exposed on the joint portion 46. Thus, a stitch pattern configured in which the joint portion 46 constitutes a joint, the first thread stitch portions 34 and 34 in two rows across the joint portion 46 constitute out-stitches, the second thread stitch portions 36 exposed on the joint portion 46 constitute in-stitches which appear at the joint, and a stitch imitating double-stitch appears on the design surface.

(3) While an instrument panel is cited as an example of are resin molded article in the embodiments, the present invention also applicable to other products formed with a stitch pattern, such as vehicle interior members, like door trims, pillars garnishes, and lids of globe boxes, and furniture.

(4) The resin molded article according to the present invention may also have a configuration in which the first member is located not only around a location corresponding to the stitch pattern, but also throughout the entire back side of the second member. For example, the first member may be a substrate which secures the rigidity of the resin molded article, and the second member covering the first member can be a flexible skin material.

(5) In stead of forming both first thread stitch portions and second thread stitch portions in a single first member, it is possible to divide the first member into two: a first member having the first thread stitch portions formed thereon and a first member having the second thread stitch portions formed thereon. Further, the first member can be divided along the alignment direction of the stitches.

(6) The slits in the first member may not be formed between respective adjacent thread stitch portions, and they can be formed at a predetermined interval of thread stitch portions or at a predetermined pitch. It is also possible to omit the slits. The slits are not limited to a groove shape with a bottom as shown in the embodiments, and they can also be in a shape of a hole penetrating through the base portion in a protruding direction of the thread stitch portions.

(7) The engaging portions of the first member may be provided as needed.

(8) The first member is not limited to those formed entirely in the same color; for example, the thread stitch portions and the base portion can be of different colors from each other.

(9) Regarding the colors of the thread stitch portions in the first member and the surface of the second member, it is preferred that the resin materials for molding them be colored before molding in view of ease of manufacture, but the first member can be colored in a process after the molding.

(10) The method of producing the resin molded article is not limited to two-color molding (double injection molding), and it can be a so-called insert molding in which a separately molded first member is set in a molding die for molding a second member so as to mold the second member.

The invention claimed is:

1. A method of producing a resin molded article provided with a stitch pattern formed on a design surface thereof, comprising the steps of:

molding a first member provided with a plurality of thread stitch portions aligned on a front side thereof so as to protrude toward the design surface side of the resin molded article, the respective thread stitch portions longitudinally extending along an alignment direction of the plurality of thread stitch portions, and molding a second member in a color different from that of the thread stitch portions of the first member so that the second member can cover the front side of the first member with protruding ends of the thread stitch portions exposed therefrom and sunken portions recessing toward the thread stitch portions are formed around the thread stitch portions, thus allowing the plurality of thread stitch portions exposed from a surface of the second member constituting the design surface to form the stitch pattern.

2. The method of producing a resin molded article according to claim 1, wherein the first member and the second member are integrally molded by two-color molding with a common die portion forming a back side of the resin molded article, when molding the first member, engaging portions in a concave or convex shape are formed on the back side of the first member so as to correspond to positions where the thread stitch portions are formed, and the second member is molded in a state that the engaging portions are engaged with the common die portion having molded the back side of the first member.

3. The method of producing a resin molded article according to claim 1, wherein when molding the first member, adjacent thread stitch portions protruding from a surface of a base portion of the first member towards the front side are formed on the base portion to be separated from one another, and a slit extending to cross the alignment direction of the plurality of thread stitch portions and opening in a protruding direction of the thread stitch portions is formed between the adjacent thread stitch portions in the base portion of the first member, and when molding the second member, a resin raw material constituting the second member is flowed into the slit of the first member being held in a cavity between the common die portion and a secondary die portion for molding the resin molded article.

4. The method of producing a resin molded article according to claim 2, wherein in the two-color molding, a molding surface of a primary die portion for molding the front side of the first member has concavities and convexities in fine streaks at positions corresponding to the thread stitch portions, thereby, when molding the first member, the concavities and the convexities are created on the protruding ends of the thread stitch portions, and a molding surface of the secondary die portion for molding a front side of the second member has the concavities and the convexities in the fine streaks at positions corresponding to the thread stitch portions, thereby, when molding the second member, the concavities and the convexities of the protruding ends of the first member are fitted into and sealed with the concavities and the convexities in the molding surface of the secondary die portion.

* * * * *